United States Patent [19]

Kayser et al.

[11] Patent Number: 5,190,218

[45] Date of Patent: Mar. 2, 1993

[54] SPRAYING LIQUIDS WITH A SMALL TRACTOR

[76] Inventors: Howard H. Kayser, R.R. 2, Box 5; Steven A. Claude, 1310 Front St., both of Garner, Iowa 50438

[21] Appl. No.: 685,036

[22] Filed: Apr. 15, 1991

[51] Int. Cl.$^5$ .......................... B05B 1/20; A01C 23/00
[52] U.S. Cl. ...................... 239/172; 239/142; 239/175
[58] Field of Search ............... 239/142, 157, 164–169, 239/172, 175, 176; 56/16.8, 16.9

[56] References Cited

U.S. PATENT DOCUMENTS

| | | | |
|---|---|---|---|
| 2,044,884 | 6/1936 | Keller | 56/16.8 |
| 2,111,030 | 3/1938 | Mote | 56/18.8 |
| 2,573,784 | 11/1951 | Asbury | 56/16.8 |
| 2,584,484 | 2/1952 | McIntosh | 239/169 |
| 2,599,448 | 6/1952 | Hamilton et al. | 239/168 |
| 2,618,509 | 11/1952 | Carlson | 239/168 |
| 2,737,340 | 3/1956 | Bonini | 56/230 |
| 2,740,248 | 4/1956 | Pickens | 56/229 |
| 2,774,626 | 12/1956 | Gerbracht | 239/157 |
| 3,534,533 | 10/1970 | Luoma | 56/25.4 |
| 3,857,515 | 12/1974 | Zennie | 239/169 |
| 4,242,855 | 1/1981 | Beaver, Jr. | 56/13.7 |
| 4,725,004 | 2/1988 | Baran, Jr. | 239/164 |
| 4,821,959 | 4/1989 | Browning | 239/121 |
| 4,913,345 | 4/1990 | Setter | 239/142 |

Primary Examiner—Kevin P. Shaver
Assistant Examiner—Karen B. Merritt
Attorney, Agent, or Firm—Zarley, McKee, Thomte, Voorhees & Sease

[57] ABSTRACT

A medium sized spraying system quickly and easily mountable on a small sized tractor having an auxiliary power take off at or near the front of the tractor. A fluid pump is mountable near the front power take off and utilizes the power of a front power take off to produce pumping action. Fluid conduits are directed to the rear of the tractor where a support framework is releasably connected to the rear of the tractor. The support frame holds a substantially sized fluid tank and a spraying boom.

8 Claims, 2 Drawing Sheets

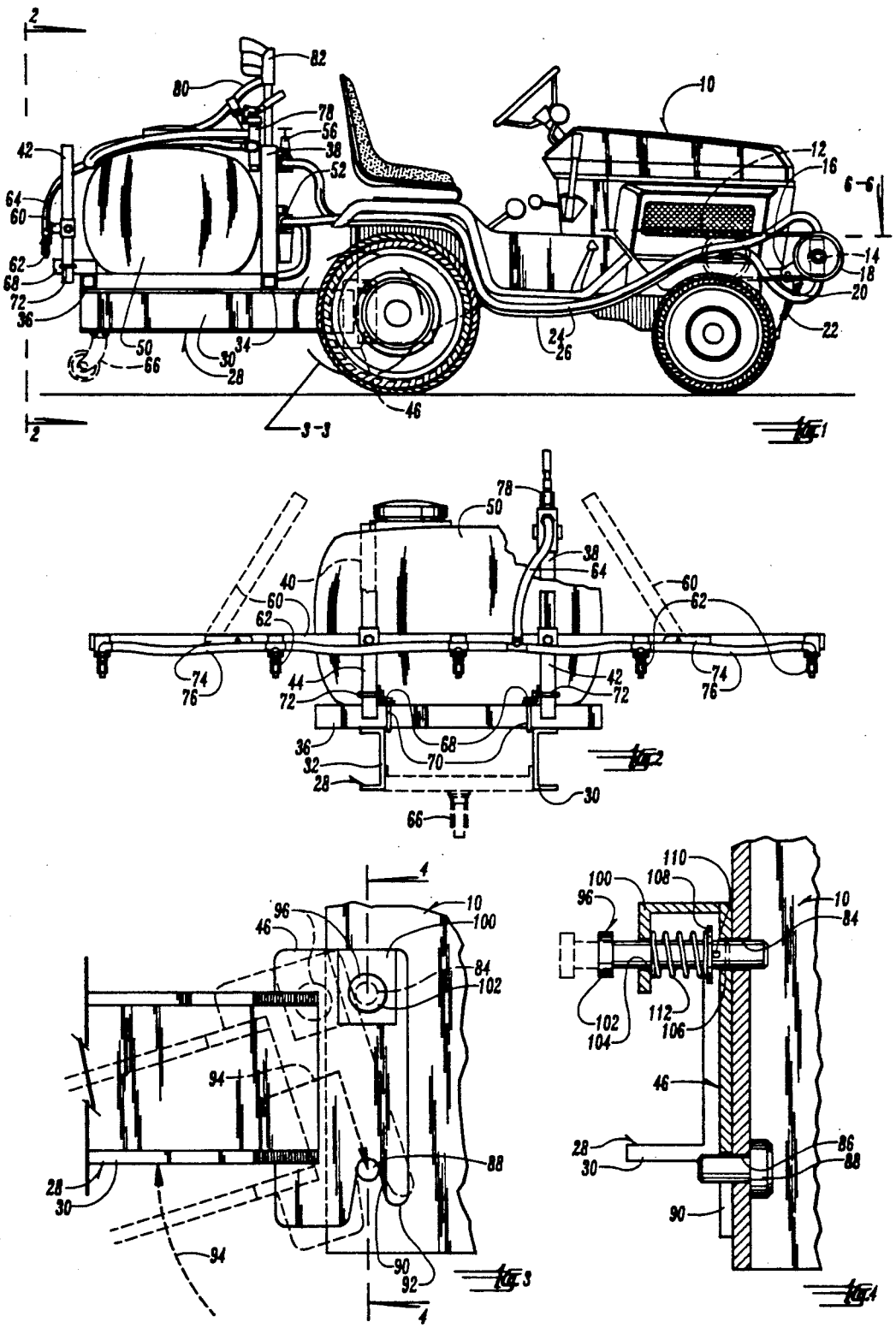

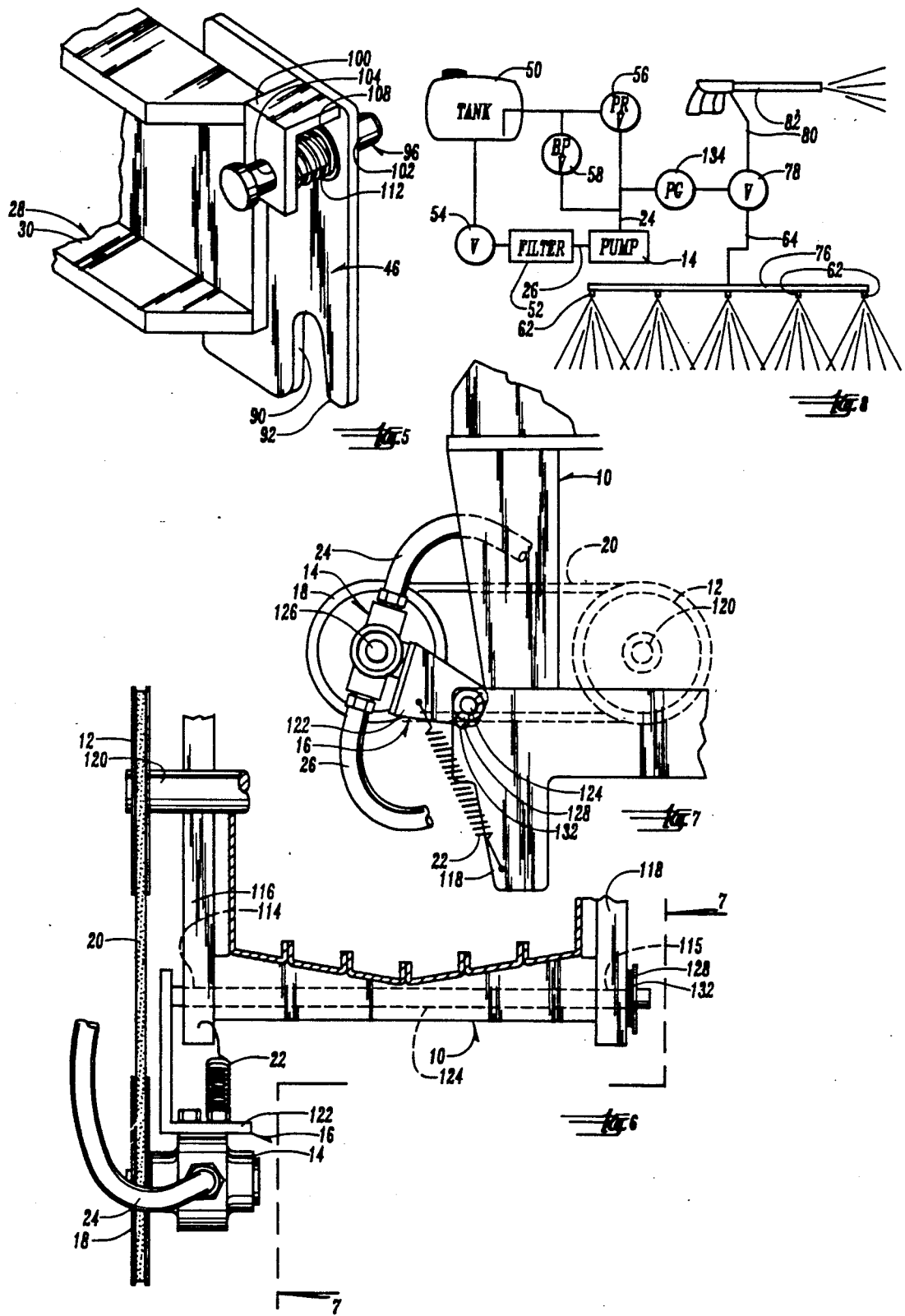

SPRAYING LIQUIDS WITH A SMALL TRACTOR

BACKGROUND OF THE INVENTION a. Field of the Invention

This invention relates to a means and method for spraying liquids, and in particular, relates to a spraying system that can be utilized with a small sized gas or diesel powered tractor.

b. Problems in the Art

A variety of needs exist for application of fluids by spraying. Spraying generally provides a way to apply liquids over a relatively wide area in a relatively uniform manner. It many times presents the most efficient way of application of such substances as fertilizers, insecticides, herbicides, and other chemicals.

The type of spraying apparatus used for a certain job depends on a number of factors. Very large scale jobs might utilize large scale equipment, which most time necessitates large trucks or tractors which can support large liquid tanks, large booms, and large power sources to produce the pressure required to provide adequate spray. On the other hand, various small scale jobs, such as home gardening tasks, may require only a hand-held, manually operated sprayer and spraying tank.

A significant amount of spraying tasks could be conducted most efficiently by utilizing a spraying system of a size in between those described above. The primary example would be residential or commercial lawns. A hand sprayer would be inefficient in the terms of the time required, as well as the risk that application would not be even. A large spraying unit simply would not easily be maneuverable or could damage the lawn. A need therefore exists in the art for what will be called medium-sized spraying systems.

Attempts have been made to fill this need. Currently, many lawn care chemical companies utilize large tank trucks that have long hoses connected to hand-held spraying wands. The worker would drive the truck to the location and then walk over the area to be sprayed. The advantage is that a large amount of liquid is always available and the worker can maneuver into almost any location to provide spraying to that location.

Several disadvantages exist with this system, however. First of all, many if not all sprayed chemicals require a reliable and even distribution to function optimally. Any time application depends upon a person with a manually controlled spraying nozzle or wand, the risk that the application will not be complete, reliable or even, is significant. It is simply impossible for a person to very accurately monitor what areas have been sprayed, as well as insure evenness of spraying from area to area. It is difficult, if not impossible, for a person to maintain constant speed, with a constant application of spray, when they are walking across the lawn and having to move the spraying device. Such workers generally try to complete the task as quickly as possible, with the minimum amount of chemicals needed. It can therefore be appreciated how this system has meaningful deficiencies.

A still further concern with this type of system is the exposure of the worker to chemicals that are being sprayed. Generally the spray pattern is in front of the worker so that the worker can watch both what is being sprayed as well as what lies ahead. The spray mechanism cannot be very big or it would not be able to be easily manipulated by the worker. Therefore, the worker is exposed quite closely to the spray substance; which many times can be very dangerous to health.

Other attempts are known which attempt to combine a spraying unit with some sort of motorized and even self-propelled system. Small sprayer systems powered by a self propelled but walk behind mower are known in the art. The deficiencies of these systems are the inability to carry a very large sized liquid holding tank as well as the operator again would be significantly exposed to the chemicals. Still further, most these systems require alteration of the mower to a substantial extent.

It has been determined that the best medium sized spraying system should be combined with a small tractor, such as the larger type of lawn and garden tractors, or the smaller type of general purpose tractors. This would eliminate the operator from having to walk over the area to be sprayed and allows transport of significantly larger liquid holding tanks than could be manually carried or even manually pulled in some sort of a wagon or sled. While attempts have been made to accomplish this sort of system, clear deficiencies exist in those systems.

Some utilize the direct current battery of the tractor to power a direct current electrical pump to spray the liquid. The prime disadvantage with this type of system is that the normal 6 or 12 volt battery is insufficient to produce enough pumping action or spraying pressure to provide either wide scale spraying, or even a very reliable, accurate, and consistent spraying. For example, most such systems could handle no more than three spraying heads or nozzles spaced a few feet apart. Still further, such systems cannot provide auxiliary functions, such as agitation of the liquid in the liquid tank to insure accurate mixing of chemicals.

Other attempts use hydraulic motors to provide the pumping action and pressure. However, either the hydraulic motor must be added as a part of the system, or it must already exist on the tractor. Normally, such motors only exist on quite large tractors or trucks. In that case, those vehicles would not be maneuverable in tight locations. Effectively, they are precluded from being driven on locations such as residential lawns because of their weight and the potential for damage to the lawn.

Still other attempts utilize separate gasoline powered engines to develop the pumping action and pressure required. Some of these engines are sufficient to produce substantial pressure in a system that can cover quite a wide area. However, many times these type of systems are mounted in a trailer which is towed behind the tractor. This is cumbersome and decreases maneuverability significantly. Additionally, the gasoline engines of this size are loud and may not be easily controllable to provide the accurate reliable spraying action needed. Again, the provision of an additional power source such as the gasoline engine is costly.

The inventors are aware of one attempt to mount all the components on the small tractor and to utilize the engine of the tractor itself to power the pumping action. In Browning, U.S. Pat. No. 4,821,959, this system is illustrated and described. While it achieves the ability to avoid having a separate power source for pumping, and integrates the spraying apparatus with the tractor, it also has deficiencies, or at a minimum, disadvantages which can be improved upon. First, as is prominent in the Browning patent, significant alterations have to be made to the lawn mower tractor to allow that system to work. Most importantly, the drive train of the tractor had to be altered so that the crank shaft from the engine was hooked into the pump for the spraying system. This requires that the tractor have a crank shaft which extends rearwardly and then upwardly to the pump. It also requires the provision of a separate clutch so that the spraying system can be turned on or off. Such alterations are complex and expensive. They limit the ability of the unit of Browning to be utilized to only a few specially configured, expensively modified lawn tractors.

There is a real need in the art for a medium sized spraying system which can be integrated with a small tractor without having to modify the tractor. Such a system would be economical in that it would utilize the power system of the tractor to power the spraying system. Additionally, it would not require any customizing or expensive components. It would also enjoy the advantage of being able to support a relatively large liquid holding tank, allow the operator to significantly avoid exposure with any chemical sprayed, and would also allow high maneuverability in combination with good control of ground speed and spraying pressure.

It is therefore a primary object of the present invention to provide a means and method of spraying liquids with a small tractor which improves over or solves the deficiencies and problems in the art.

Another object of the present invention is to provide a means and method as above described which utilizes the power of the small tractor to provide the pumping action and spraying pressure for the spraying system.

Another object of the present invention is to provide a means and method as above described which relies on the power system of the tractor, but is adjustable with respect to how much pressure is provided; but maintains the selected pressure at a generally constant and reliable level.

A still further object of the present invention is to provide a means and method as above described which allows utilization of a substantially sized liquid holding tank to minimize the amount of refilling that is needed.

A still further object of the present invention is to provide a means and method as above described which does not require alteration or customization of the tractor.

A still further object of the present invention is to provide a means and method as above described which does not require utilization of a trailer to carry the sprayer or a separate engine or power the sprayer.

A still further object of the present invention is to provide a means and method as above described which can provide spraying with a range of different spraying mechanisms, including significantly wide spraying booms, down to fairly narrow spraying booms, or even hand-held spraying wands.

Another object of the present invention is to provide a means and method as above described which is highly maneuverable and not damaging to lawns or ground surfaces.

A still further object of the present invention is to provide a means and method as above described which can power mixing or agitation of liquid in the liquid holding tank.

A still further object of the present invention is to provide a means and method as above described which can be quickly attached or detached from the tractor.

Another object of the present invention is to provide a means and method as above described which allows highly efficient spraying in terms of the rate and application of liquids.

An additional object of the present invention is to provide a means and method as above described which maximizes the amount of coverage of spraying and minimizes the amount of drift or inefficient spraying.

Another object of the present invention is to provide a means and method as above described which can include a system to maintain a constant pressure at any speed of the tractor.

Another object of the present invention is to provide a means and method as above described which can be easily stored, transported, and then expanded for use.

Another object of the present invention is to provide a means and method as above described which can be used for a variety of different sprayed liquids and a variety of different spraying uses.

A still further object of the present invention is to provide a means and method as above described which can be installed on a variety of different small tractors.

Another object of the present invention is to provide a means and method as above described which is durable, economical, efficient, and easy to maintain.

These and other objects, features and advantages of the present invention will become more apparent with reference to the accompanying specification and claims.

SUMMARY OF THE INVENTION

The present invention includes a system that can be integrated with a small tractor to provide efficient but effective spraying. A support frame holding a substantially sized liquid tank is releasably connectable to the rear of the tractor. The support frame also supports a spraying boom at the very rear of the frame extended away and behind the tractor operator and substantially near the ground. Other features such as controls, filters, valves, and auxiliary spraying apparatus, such as a hand-held sprayer, can also be supported or mounted on a support frame.

A mounting bracket for supporting a fluid pump is attachable to the front of the tractor at a location near the auxiliary power pulley or sheave at or near the front of the tractor. The rotary power of the auxiliary power pulley is operatively connected to the pump. Fluid communication hoses or conduits are then connected between the front of the tractor and the rear of the tractor to communicate the pumping action to the liquid tank and spraying apparatus.

A front bracket is used to connect the pump to the auxiliary power pulley, and is mountable without modification to the tractor. The power of the tractor engine, through the auxiliary power sheave, is then utilized to maintain a highly controllable pumping action which is transferred to the tank and spraying apparatus at the back of the tractor.

The operator is therefore removed from close contact with the sprayed liquid and can control ground speed as well as spraying pressure during the spraying process. Utilization of the small tractor as the power and motive source also allows high maneuverability without needing to control a trailer.

The combination of the invention can be easily attached to the tractor. When the tank is unfilled, the weight of the unit at the rear of the tractor is relatively minimal allowing easy maneuverability and attachment. Attachment of the pump to the front of the tractor, as well as attachment of all hoses or conduits is also quick and easy. Detachment is likewise quick and easy.

The minimal number of moving parts and the non-complexity of the system minimizes maintenance and servicing, and contributes to long life and durability of the system.

It can therefore be seen that the invention meets at least all of its stated objectives.

BRIEF DESCRIPTION OF THE DRAWINGS

FIG. 1 is a side elevational view of a preferred embodiment of the present invention attached to a small tractor.

FIG. 2 is an isolated elevational view taken along line 2—2 of FIG. 1.

FIG. 3 is an isolated elevational view taken along line 3—3 of FIG. 1 illustrating the quick attachment of the rear support frame to the tractor.

FIG. 4 is a sectional view taken along line 4—4 of FIG. 3.

FIG. 5 is an isolated perspective view of the structure generally seen in FIGS. 3 and 4.

FIG. 6 is a sectional and isolated view taken along line 6—6 of FIG. 1.

FIG. 7 is an elevational view taken generally along line 7—7 of FIG. 6.

FIG. 8 is a schematic view of the spraying system of the embodiment of FIG. 1.

DETAILED DESCRIPTION OF THE PREFERRED EMBODIMENT

In order to gain a better understanding of the invention, a preferred embodiment of the invention will now be described in detailed fashion. Reference will be taken to the drawings which accompany this description. In particular, reference numerals on the drawings will be utilized in the description to indicate specific parts or locations in the drawings. The same reference numerals will be used to indicate the same parts and locations throughout the drawings, unless otherwise noted.

It is important to understand that the invention claimed by the inventors is not necessarily limited to any specifics set forth in this detailed description. This description is soley presented to provide the reader with sufficient information to make and use one embodiment of the invention. The claims following this description define the scope of the invention which is broader than this embodiment.

Referring to FIG. 1, a lawn tractor 10 can be seen. In the preferred embodiment, tractor 10 can be any type of small gas or diesel powered tractor with an auxiliary power pulley or power take off at or near the front of the tractor. In this instance, tractor 10 is a John Deere 214 lawn and garden tractor with a vertical auxiliary PTO pulley or sheave 12 along the front right side of the tractor.

As is well known in the art, sheave or pulley 12 is engageable by a control lever and will rotate at a speed proportional to the RPMs generated by the tractor's engine.

A pump 14 secured to a bracket 16 is connectable to the front of tractor 10 by releasable means which will be discussed further below. A pulley 18 is mounted to pump 14. A V-shaped closed loop drive belt 20 is then fittable around sheave 12 and pulley 18, as illustrated in FIG. 1. A spring 22 extends between bracket 16 (which is pivotable on the front of the tractor) and the tractor, to keep the belt 20 in tension.

Hoses 24 and 26, attached to opposite sides of pump 14, extend back along the length of tractor 10. Hoses 24 and 26 can be releasably secured in that position by means well within the skill of one of ordinary skill in the art. Examples would be coated wiring, VELCRO type fasteners, tape, or other means.

In the preferred embodiment, pump 14 is a series 4001/4101 Hypro Roller Pump available from Hypro, New Brighton, Minnesota. In this instance, pump 14 is non-self-priming. It is to be understood that different types of pumps, selfpriming or not, could be utilized.

The remaining components of the spraying system are attachable to the rear of tractor 10, as shown in FIG. 1. A support frame 28 comprised of parallel channel beams 30 and 32, cross beams 34 and 36, vertical posts 38 and 40 (40 not shown in FIG. 1), and vertical posts 42 and 44 (vertical post 44 not shown in FIG. 1), comprise the basic frame structure. Brackets 46 and 48 are attached to channel beams 30 and 32 and includes structure to quickly and easily mount support frame 28 to the existing rear mounting structure on tractor 10, as will be described in more detail below.

Liquid holding tank 50 is supported in frame 28. Vertical posts 38 and 40, along with vertical posts 42 and 44, assist in confining tank 50 and frame 28. Vertical posts 38 and 40 also serve to allow for attachment of features of the spraying system such as a filter 52, tank shut off valve 54, pressure relief valve 56 and bypass valve 58.

Vertical posts 42 and 44 support boom 60. It is to be understood that boom 60 can be vertically adjusted along posts 42 and 44 according to desire. As can also be seen, boom 60 supports nozzles 62 which are connected to hoses 64 and 76 which will distribute liquid from tank 50 under pressure, which will then spray out of nozzles 62.

It can therefore be seen that support frame 28 holds a substantially sized tank 50. In the preferred embodiment, tank 50 is a 30 gallon tank. For tractors of this size, the tank can be anywhere from much smaller than 30 gallons, to perhaps as high as 50 gallons. The support frame 28, with its strong beams and cross beams, enables tractor 10 to support such weight, even when tank 50 is filled. Most of the weight of tractor 10 is towards the front of the tractor because the engine is in front of the tractor 10.

It is to be noted that channel beams 30 and 32 extend basically rearwardly from tractor 10 substantially parallel to the ground. The back ends of channel beams 30 and 32 therefore can serve as protection against the front of tractor 10 lifting very far off the ground for any reason. As an optional feature, as shown in dash lines in FIGS. 1 and 2, a small wheel or wheels 66, pivotable 360°, could be attached at or near the outer ends of beams 30 and 32, as further protection against the front end of tractor 10 lifting significantly off the ground. Wheel or wheels 66 would also therefore facilitate the turning of tractor 10. If desired, wheel(s) 66 could be positioned so that it/they contact the ground most of the time.

FIG. 2 shows in more detail the preferred set up for boom 60, as well as features of support frame 28. As can be appreciated by those of ordinary skill in the art, channel beams 30 and 32, as well as cross beams 34 and 36, and vertical posts 38 and 40 could be welded together. Other attachment methods could be used, in the alternative, such as bolts or clamps.

In the preferred embodiment, clamps are utilized to secure vertical posts 42 and 44 to the rearward-most cross beam 36. Angle iron pieces 68 are clamped by U-bolts 70 to cross beams 36. U-bolt 72 are used to clamp vertical posts 42 and 44 to angle iron 68. By utilizing this arrangement, vertical posts 42 and 44 can be adjusted vertically if desired. Also, they can be quickly disassembled. In FIG. 2 it can be seen that channel beams 30 and 32 are parallel and spaced apart, but the distance between them is less than the distance between the rear wheels of tractor 10. The width of tank 50 is not substantially more than the width of tractor 10. This allows the equipment, even when attached to tractor 10, to pass through the same openings that tractor 10 can pass through; and also allows for storage and transportation without substantial difficulties. Still further FIG. 2 shows that boom 60 can be hinged. For example, hinges 74 can exist along the length of boom 60 to allow the ends of boom 60 to be pivoted (in this case upwardly). By viewing the left side of FIG. 2, this ability is illustrated with the upwardly raised position of the end of boom 60 shown in dashed lines. This also allows for storage or transportation, or even passage through an opening that is not much wider than tractor 10 itself.

FIG. 2 also shows how each nozzle 62 is in fluid communication by hoses 76 to hose 64, which leads up to a valve 78. Valve 78 controls whether liquid to be sprayed passes through hose 64 and through hoses 76 to nozzles 62; or is channeled to a hose 80 in communication with spray gun 82, such as is known in the art. Spray gun 82 can be used for specific applications or locations. As an alternative example, spray gun 82 could be used to spray chemicals on livestock, insecticide on fruit, or even be used as a power washer. The uses for this system are limitless.

FIGS. 3-5 show in large detail the quick attach and detach system for support frame 28. In the preferred embodiment, the rear of tractor 10 includes top and bottom apertures 84 and 86 on opposite sides. These type of apertures are utilized for connection to a variety of components or equipment. They can be used separately or in combination with a trailer hitch (not shown). An example of another implement that could be attached utilizing apertures 84 and 86 would be a rototiller device.

Although support frame 28, and the other elements supported on support frame 28, are substantial in size, it can be appreciated that once tank 50 is empty, cumulatively the weight of the system is not very high. It is estimated that it would be on the order of approximately 50 pounds utilizing conventional materials for these components. It is therefore possible for one person to lift easily at least one end of support frame 28. In order to enhance the ability to quickly attach and detach frame 28 from tractor 10, pins 88 are secured from the inside out through bottom apertures 86 (see FIG. 4). Brackets 46 and 48, secured to the forward end of channel beams 30 and 32, have a slot 90 extending from the bottom of brackets 46 and 48 inwardly. Slot 90 is tapered so as to narrow as it extends inwardly, to basically mate with the diameter of pin 88. It is also noted that end 92 of brackets 46 and 48 is rounded.

The distance between brackets 46 and 48 is slightly wider than the distance between the walls of tractor 10 in which the top and bottom apertures 84 and 86 exist. To attach frame 28 to the tractor, the front end of frame 28 containing brackets 46 and 48 is lifted leaving the rear end of channel beams 30 and 32 on the ground. Frame 28 is either pulled to tractor 10, or tractor 10 is backed up until brackets 46 and 48 can be maneuvered and raised above pins 88 and then dropped on to pins 88. FIG. 3 shows in dashed lines the position of support frame 28 when it is dropped on to pins 88. Dashed arrow 94 basically shows the movement required to bring frame 28 to this position.

Referring to FIGS. 4 and 5, it can be seen that brackets 46 and 48 include spring loaded pins 96 and 98. As seen in FIG. 5, an L-shaped piece is welded on the top of brackets 46 and 48 on their outside side so that pieces 100 are basically inverted. Pin 102 is inserted through aperture 104 and piece 100 and then through aperture 106 in bracket 46 or 48. By referring to FIGS. 4 and 5 it can be seen that pin 102 is biased inwardly by assembling a washer 108 between a transverse key 110 through pin 102 and a spring 112. Spring 112 constantly pushes against washer 108 to move pin 102 inwardly.

Returning to FIG. 3, it can therefore be seen that after frame 28 is moved to the position shown in dashed lines in FIG. 3, it is pivoted upwardly while at the same time pins 102 are pulled outwardly (see dashed lines in FIG. 4). When apertures 104 and 106 come into alignment with top apertures 84 in tractor 10, pins 102 are released and enter top apertures 84 to lock frame 28 in a position basically horizontal and parallel with the ground. Pins 102 and 88 therefore prohibit rotation of frame 28, but securely hold it in position. Pins 102 and 88 must be made of a strong material, preferably hardened steel.

Disassembly is just as easy. Pins 102 are pulled outward, the rear of frame 28 is allowed to pivot down to the ground, and then the front of frame 28 is lifted off of pins 88 and set onto the ground.

It is to be understood that a similar quick release scheme can be configured for most small tractors. The actual configuration may change between tractor to tractor, and may change significantly. However, most can work substantially similarly to that described in this preferred embodiment.

FIGS. 6 and 7 shown in large detail the attachment of pump 14 to the front of tractor 10. In the preferred embodiment, tractor 10 has apertures 114, 115 in opposite members 116 and 118 at its front end. FIG. 6 shows axle 120 of the auxiliary power source or PTO at the front of tractor 10. Axle 120 is securely attached to sheave 12. An L-shaped plate 122 is rigidly secured at one end to a rod 124. The other leg of L-shaped member 122 provides the mounting surface for pump 14, by bolts or otherwise. FIG. 6 also shows how pulley 18 of pump 14 is attached to axle 126 of pump 14.

Pump 14 is mounted onto tractor 10 as follows. Rod 124 is inserted through apertures 114 and 115. Washers 128 are placed over the outer end of rod 24 outside of aperture 115 and secured in place by a key or pin 132, such as is known in the art. Rod 124 is rotatable within apertures 114 and 115. Pump 14 and pulley 18 are then moved upwardly or downwardly by rotating rod 124 to allow belt 20 to be put into place on sheave 12 and pulley 18 as shown in FIGS. 6 and 7. Pump 14 and pulley 18 are then moved to a position where pulley 18 is basically horizontal from sheave 12 to tighten belt 20 in place. Spring 22 is then connected between L-shaped member 122 and an aperture or hook on tractor 10 to hold belt 20 in tension. Rotational operation of sheave 12 then causes rotational power to be transferred by belt 20 to pulley 18, which in turn operates pump 14.

It is to be understood that the diameter of pulley 18 can be changed to achieve different pumping action with pump 18. Such changeovers are easily accomplished by simply detaching one pulley 18 from pump 14 and replacing another. In the preferred embodiment, pulley 18 is approximately 8 inches in diameter.

FIG. 8 shows in schematic form, the spraying circuit of the preferred embodiment of the invention. The basic pumping circuit includes a pump 14 with hose 24 extending to pressure relief valve 56 and then into tank 50. Hose 26, from the other side of pump 14 extends through filter 52, tank shut off valve 54, and then to the bottom of tank 50. When tank shut off valve 54 is opened, and pump 14 is operated (after priming), hose 24 will provide pressure to tank 50 and actually agitate the contents of tank 50 to provide good mixing of whatever fluid might be in there. Hose 26, alternatively, will suction liquid from tank 50, filter any contaminants and particulate matter at filter 52, and direct the fluid through pressure gauge 134 to valve 78. Depending on which way the valve is turned (closed, or directional), fluid will be directed to either spray gun 82 or nozzle 62 on boom 60.

In the preferred embodiment, it is to be understood that a bypass circuit including bypass valve 58 is also incorporated into the spray circuitry. The bypass circuit allows the maintenance of constant pressure regardless of RPMs of the tractor or load on the tractor. Pressure release valve 56 will basically release pressure once it exceeds a certain level. Therefore, if for some reason pressure in the circuitry goes above a certain point, valve 56 will operate. By including the bypass circuitry, however, no matter what is happening through the primary circuit, the bypass valve will maintain pressure to the tank 50.

Furthermore, it is to be understood that pressure gauge 134 can be positioned in any location which is desirable by the user. It can then be monitored to make sure that pressure remains constant throughout the system. If pressure is dropping, bypass valve 58 can be operated to bring pressure back in line.

All these features are conventional and are off the shelf items. Operation of a system is therefore easily understandable by one of ordinary skill in the art.

It will be appreciated that the present invention can take many forms and embodiments. The true essence and spirit of this invention are defined in the appended claims, and it is not intended that the embodiment of the invention presented herein should limit the scope thereof.

As mentioned before, certain different configurations might be required by mounting support frame 28, or pump bracket 16, depending on the type of tractor. For example, some tractors have front auxiliary power sheaves 12 which are positioned differently. Some are even horizontal in orientation, instead of vertical as shown in the drawings. Modifications can be made, as are within the skill of those of ordinary skill in the art, to accomplish the invention while staying within the boundaries of the invention.

Different types of pumps can be utilized, and perhaps even different ways to transfer the power from the sheave 12 to pump 14.

Different widths of booms 60, as well as different number and spacing of nozzles 62 can be accomplished. Generally, boom 60 would be envisioned to be anywhere from 8 feet wide to 24 feet wide, but other sizes are possible.

The pressure of the system in the preferred embodiment can be anywhere from 0 to 130 pounds. Twenty pounds per square inch is preferred because of the coverage achieved balanced against the amount of drift that would occur. The higher the pressure, the finer the spray and the more it would drift.

It can be appreciated that pump 14 could be self priming. Operation of the system, including some of the valves, could be by electric solenoid or other push button control at the driver's location. Still further, it could be appreciated that a configuration could be made to allow both spraying and other use of the front PTO sheave 12. For example, spraying and mowing at the same time might be accomplished.

What is claimed is:

1. A spraying system for attachment to a lawn and garden size tractor having a rotating auxiliary drive means near the front of the tractor, a front connection means at the front of the tractor, and a rear connection means at the rear of the tractor, comprising:

mounting means connectable to the front connection means for holding a mechanically-powered fluid pump means to allow operative connection of the fluid pump means to the auxiliary drive means, the front connection means including aperture in the front of the tractor, the mounting means including a bar insertable into said apertures and being releasably securable by locking means;

frame means for supporting a spraying tank and spraying boom;

attachment means for attaching the frame means to the rear connection means at the rear of the tractor, the rear connection means including pins extending from positions generally at the rear of the tractor, the attachment means comprising a quick attach means including bracket means having generally vertical slots which can be inserted over said pins, and having quick release means to lock the frame means to the rear of the tractor and in a generally horizontal position, said quick release means being spaced from said pins, the vertical slots and the pins allowing the frame means to be pivoted on the pins so that one end of the frame means which includes the quick attach means can be lifted and connected to the pins, and the opposite end then pivoted up to horizontal and the frame means locked into position with the quick release means; and fluid connection means for fluidly communicating between the mounting means at the front of the tractor and the frame means at the rear of the tractor to allow pumping action with respect to the contents of the spraying track and the spraying boom, the fluid pump means being mechanically driven by the auxiliary drive means at the front of the tractor, but delivering pumping action to the boom and tank at the rear of the tractor.

2. The system of claim 1 furthering comprising a bypass circuit means to maintain the pressure in the fluid communication means regardless of RPMs of the tractor.

3. The system of claim 1 wherein the pump means is connected to the auxiliary drive means by a closed loop belt and pulley.

4. The system of claim 3 wherein the belt is kept tensioned by allowing the pump means and pulley to be pivoted and biased to maintain tension on the belt.

5. A spraying means for enabling a relatively small lawn and garden size tractor having a front end, rear end, and an auxiliary drive pulley generally near the front end of the tractor to produce efficient, controllable, and reliable spraying pressure for a substantially-sized liquid holding tank and spraying mechanism comprising:

a support frame having a front, a rear and opposite sides, and including a first mounting means for holding and supporting a tank of at least several gallon capacity, second mounting means for holding and positioning a spraying mechanism, and attachment means at the front of the support frame for releasably attaching the support frame to the rear end of the tractor, the attachment means for releasably attaching the support frame to the tractor including pins, at least some of which are spring loaded, for quick and easy mating into apertures positioned in the rear of the tractor;

the support frame extending rearwardly from the tractor when attached, the sides of the frame being generally no wider than the tractor;

a pump mount including support means for securement of a fluid pump means, connection means for releasable attachment of the pump mount means at generally the front of the tractor, and the transfer means for transferring mechanical power from the auxiliary drive pulley to a pump pulley which can be operatively connected to the fluid pump means, the connection means for releasable attachment at the front of the tractor for the pump mount means including a bar insertable into apertures in the front of the tractor, and being releasably securable in that position by a locking means; and fluid conduits connectable between the pump mount means, the tank, and the spraying mechanism to provide a pumping network powered by the auxiliary drive pulley and the fluid pump means at the front of the tractor and delivering pumping action to the tank and spraying mechanism at the very rear of the tractor, the size of the auxiliary drive pulley and pump pulley at least partially determining the pressure produced by the spraying means.

6. The means of claim 5 wherein the support frame includes parallel spaced apart frame members.

7. The means of claim 5 further comprising a bypass circuit including a bypass valve to maintain the level of pressure at the spraying mechanism regardless of the RPM of the tractor.

8. The means of claim 5 including a pressure relief valve for insuring a certain level of pressure will not be exceeded in the fluid conduits.

* * * * *